United States Patent Office 3,128,224
Patented Apr. 7, 1964

3,128,224
THIOPHOSPHONATES HAVING A URETHANE GROUPING
John G. Brady, Campbell, Calif., and Karoly Szabo, Pleasantville, N.Y., assignors to Stauffer Chemical Company, New York, N.Y., a corporation of Delaware
No Drawing. Filed Aug. 6, 1962, Ser. No. 214,840
8 Claims. (Cl. 167—22)

This invention relates to organophosphorus compounds and in particular to thiophosphonic acid esters characterized by the presence of a urethane grouping. The invention also pertains to a method of preparing the compounds and to their use as the active component in the manufacture of pesticidal compositions.

The present invention is predicated on the discovery that the incorporation of a urethane moiety in a thiophosphonic acid—thiophosphonic acid as used herein is a generic term and includes both phosphonothioic and phosphonodithioic acids—gives rise to a class of organophosphorus esters which are unusually lethal to insects and similar pest organisms falling within the lower orders of classification.

It is accordingly a primary object of this invention to provide the aforesaid thiophosphonic acid esters and a method of preparing them. Other objects will become manifest as the description proceeds.

The organophosphorus esters as contemplated herein can be represented by the following general formula:

$$\text{R}-\overset{\overset{\displaystyle Y}{\|}}{\underset{\underset{\displaystyle OR_1}{|}}{P}}-\text{S}-\text{CH}_2\text{CH}_2-\text{NH}-\overset{\overset{\displaystyle O}{\|}}{\text{C}}-\text{OR}_2$$

wherein each of R, $R_1$ and $R_2$ designate a lower alkyl radical of from 1 to 4 carbon atoms as typified by methyl, chloromethyl, ethyl, n-propyl, sec. butyl, isobutyl, etc. and Y is a chalcogen of the type exemplified by oxygen and sulfur.

Compounds which are illustrative of the general formula include the structures set forth in the list below:

Compound 1: Ethyl-N-[2-(O-ethyl ethylphosphonodithioyl)ethyl]carbamate

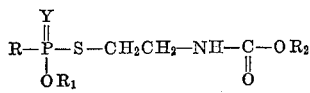

Compound 2: Methyl-N[2-(O-methyl methylphosphonothioyl)ethyl]carbamate

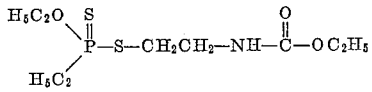

Compound 3: Ethyl-N[2-(O-methyl ethylphosphonodithioyl)ethyl]carbamate

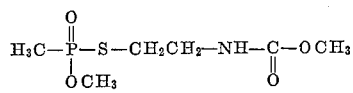

Compound 4: Ethyl-N-[2-(O-ethyl isobutylphosphonodithioyl)ethyl]carbamate

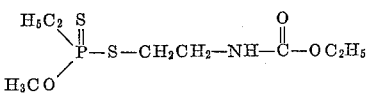

Compound 5: Ethyl-N[2-(O-n-propyl ethylphosphonodithioyl)ethyl]carbamate

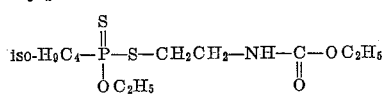

Compound 6: Ethyl-N-[2-(O-ethyl ethylphosphonothioyl)ethyl]carbamate

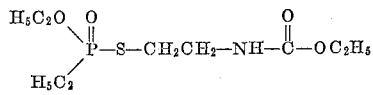

In preparing the compounds of the invention, we have found that they can be realized by a general synthetic procedure in which a salt of a lower alkylthiophosphonic acid is condensed with an N-2-haloethylurethane. The course of the reaction proceeds in accordance with the following scheme:

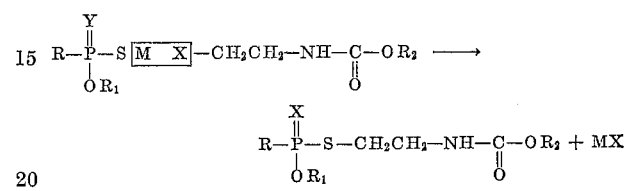

wherein X signifies halogen such as chlorine or bromine; M represents an ammonium radical or an alkali metal such as sodium, lithium, potassium, etc., and R, $R_1$, $R_2$ and Y have the values defined elsewhere herein. The reaction is conveniently carried out by refluxing the reactants using approximately molar proportions in a normally liquid organic solvent and for this purpose the lower saturated aliphatic alcohols have proved to be especially suitable. However, other liquid media can also be used and the general reaction is not limited to a particular solvent system.

Reference is now made to the following examples which are presented for illustrative purposes only since variations in practicing the invention without departing from the scope or spirit thereof will be apparent to those skilled in the art to which the said invention pertains.

EXAMPLE 1

Ethyl-N[2-(O-Ethyl Ethylphosphonodithioyl) Ethyl]Carbamate

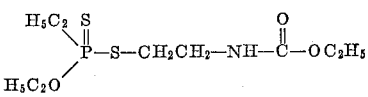

2.3 g. (0.1 mole) of sodium was dissolved in 180 ml. of absolute alcohol after which was added 17.0 g. (0.1 mole) of O-ethyl ethylphosphonodithioic acid and 15.1 g. (0.1 mole) of ethyl N-2-chloroethylcarbamate and the resulting mixture refluxed for 20 hours. The precipitate of salt, formed during the heating period, was filtered off and the organic filtrate subjected to distillation. After srtipping off the solvent, there was obtained a yellowish viscous oil which after decolorization with activated charcoal had a refractive index of 1.5324 at 24° C. The yield of purified product amounted to 91%.

EXAMPLE 2

Ethyl-N[2-(O-Methyl Ethylphosphonodithioyl) Ethyl]Carbamate

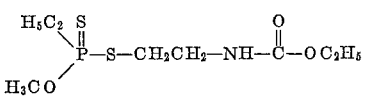

The preparation of this organophosphorus ester was patterned after the procedure as given in Example 1 but substituting an equivalent of O-methyl ethylphosphonodithioic acid for the O-ethyl reactant of the previous example. There was obtained a slightly yellow viscous oil in a yield of 87% and having a refractive index of 1.5187 at 25° C.

EXAMPLE 3

*Ethyl-N[2-(O-Ethyl Ethylphosphonothioyl) Ethyl] Carbamate*

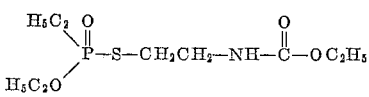

17.3 g. of O-ethyl ethylphosphonochloridothioate was slowly added to a solution consisting of 11.4 g. of potassium hydroxide, 50 ml. of alcohol and 37.5 ml. of water. During the addition, the temperature rose to 70° C. and so maintained with stirring for one hour. At the end of this period, an equivalent of ethyl N-2-chloroethylcarbamate was introduced and the resulting mixture refluxed for 16 hours. The reaction mixture was next added to 300 ml. of water and the organic components extracted twice with fresh portions of benzene, the extracts dried over anhydrous magnesium sulfate, filtered, and subjected to distillation. After removal of the solvent, there was obtained a residual yellowish oil having a refractive index of 1.4863 at 22° C.

As those in the art are well aware, various techniques are available for incorporating the active component or toxicant in suitable pesticidal compositions. Thus, pesticidal compositions can be conveniently prepared in the form of liquids or solids, the latter preferably as homogeneous free-flowing dusts commonly formulated by admixing the active component with finely divided solids or carriers as exemplified by talc, natural clays, diatomaceous earth, various flours such as walnut shell, wheat, soya bean, cotton seed and so forth.

Liquid compositions are also useful and normally comprise a dispersion of the toxicant in a liquid medium, although it may be convenient to dissolve the toxicant directly in a solvent such as kerosene, fuel oil, xylene, alkylated naphthalenes or the like and use such organic solutions directly. However, the more common procedure is to employ dispersions of the toxicant in an aqueous medium and such compositions may be produced by forming a concentrated solution of the toxicant in a suitable organic solvent followed by dispersion in water, usually with the aid of surface active agents. The latter, which may be the anionic, cationic or nonionic types, are exemplified by sodium stearate, potassium oleate and other alkaline metal soaps and detergents such as sodium lauryl sulfate, sodium naphthalene sulfonate, sodium alkyl naphthalene sulfonate, methyl cellulose, fatty alcohol ethers, polyglycol fatty acid esters and other polyoxyethylene surface active agents. The proportion of these agents commonly comprises 1–15% by weight of the pesticidal compositions although the proportion is not critical and may be varied to suit any particular situation.

Other adjuncts may be resorted to in compounding biocidal formulations based on the herein described organophosphorus esters and, in this connection, reference is made to adhesives, spreaders, activators, fertilizers and the like.

The preparation of pesticidal compositions incorporating the organophosphorus esters of this invention and the results of testing such compositions are spelled out in the following test procedures:

*Acaricidal evaluation test.*—The two-spotted mite, *Tetranychus telarius* (Linn) is employed in tests for acaricides. Young pinto bean plants are infested with several hundred mites. Dispersions of test compounds are prepared by dissolving 0.1 gram of the toxic material in ten milliliters acetone. This solution is then diluted with water containing 0.015% Vatsol (sodium salt of isopropylnaphthalene sulfonate) and 0.005% Methocel (methylated cellulose) as emulsifiers, the amount of water being sufficient to give concentrations of active ingredient ranging from 0.25% to 0.005%. The test suspensions are then sprayed on the infested pinto bean plants. After seven and fourteen days, the plants are examined both for post-embryonic forms of the mite as well as eggs. The percentage of kill is determined by comparison with control plants which have not been sprayed and the LD–50 value calculated using well-known procedures. LD–50 values are reported under the columns "2 SM" and "2 SM eggs" on the table below.

*Systemic toxicity evaluation against two-spotted mites.*—Pinto bean plants in the primary leaf stage are placed in 250 ml. capacity Erlenmeyer flasks, one plant per flask. A portion of the test compound is dissolved in 10 ml. of acetone. This solution is diluted with distilled water in an amount sufficient to give concentrations of active ingredient ranging from 100 parts per million (p.p.m.) to 1 part per million. The final volume of test dispersion per flask is 200 ml. The treated plants are infested with several hundred two-spotted mites, *Tetranychus telarius* (Linn). After seven and fourteen days, the plants are examined for postembryonic forms of the mites as well as eggs. The percentage of kill is determined by comparison with control plants which have been placed in distilled water only. The results are reported in the table under "2 SM Systemic."

*Insecticidal evaluation test.*—Four insect species are subjected to evaluation tests for insecticides:

(1) American cockroach (AR), *Periplaneta americana* (Linn)
(2) Milkweed bug (MWB), *Oncopeltus fasciatus* (Dallas)
(3) Confused flour beetle (CFB), *Tribolium confusum* (Duval)
(4) House fly (HF), *Musca domestica* (Linn)

The procedure for insects is similar to the miticidal testing procedure. Test insects are caged in cardboard mailing tubes 3⅛" in diameter and 2⅝" tall. The cages are supplied with cellophane bottoms and screened tops. Ten to twenty-five insects are used per cage. Food and water are supplied in each cage. The confused flour beetles are confined in Petri dishes without food. The caged insects are sprayed with the active compound at various concentrations. After twenty-four and seventy-two hours, counts are made to determine living and dead insects.

House fly evaluation tests differ in this respect: the toxicant is dissolved in a volatile solvent, preferably acetone, the active compound is pipetted into a Petri dish bottom, allowed to air dry and placed in a cardboard mailing tube. Twenty-five female flies are caged in the tube. The flies are continuously exposed to the known residue of the active compound in the cage. After twenty-four and forty-eight hours, counts are made to determine living and dead insects. The LD–50 values are calculated using well known procedures.

Data from testing the compounds of the invention are reported in the table below; the concentration of toxicant is indicated as parts per million or as percent; μg. refers to micrograms and represents the quantity of toxicant received by a single pest organism.

TABLE

| Compound No. | HF, μg. | AR, percent | MWB, percent | CFB | 2 SM, percent | 2 SM Eggs, percent | 2 SM Systemic, p.p.m. |
|---|---|---|---|---|---|---|---|
| 1 | 10 | >.1 | .1 | {<50 μg.} {>10 μg.} | <.001 | {<.005} {>.001} | <10 >1 |
| 3 | 50 | >.1 | >.1 | >.1% | .001 | .01 | {<10 >1} |
| 6 | {<10 >5} | .1 | <.1 | .1% | <.001 | <.001 | <1 |

We claim:
1. A thiophosphonic acid ester of the following formula:

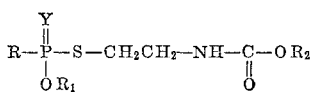

wherein R, R$_1$ and R$_2$ represent lower alkyl radicals and Y is a chalcogen selected from the class consisting of oxygen and sulfur.

2. A thiophosphonic acid ester of the formula:

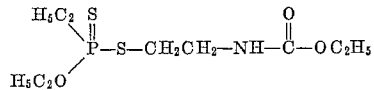

3. A thiophosphonic acid ester of the formula:

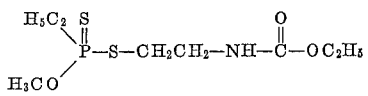

4. A thiophosphonic acid ester of the formula:

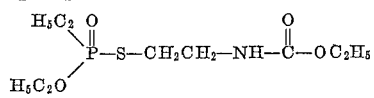

5. A method of killing lower pest organisms which comprises applying to the habitat thereof a small but effective amount of a thiophosphonic ester of the following general formula:

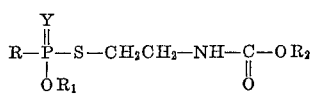

wherein R, R$_1$ and R$_2$ represent lower alkyl radicals and Y is a chalcogen selected from the class consisting of oxygen and sulfur.

6. A method of killing lower pest organisms which comprises applying to the habitat thereof a small but effective amount of a thiophosphonic ester of the following formula:

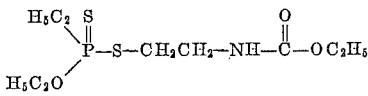

7. A method of killing lower pest organisms which comprises applying to the habitat thereof a small but effective amount of a thiophosphonic ester of the following formula:

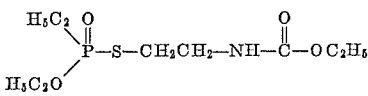

8. A method of killing lower pest organisms which comprises applying to the habitat thereof a small but effective amount of a thiophosphonic ester of the following formula:

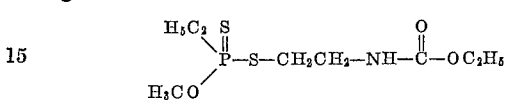

References Cited in the file of this patent
UNITED STATES PATENTS
2,918,488    Schrader _____ Dec. 22, 1959